April 7, 1925.
J. BERG
MOTOR VEHICLE VISOR
Filed Nov. 5, 1921
1,532,726
2 Sheets-Sheet 1
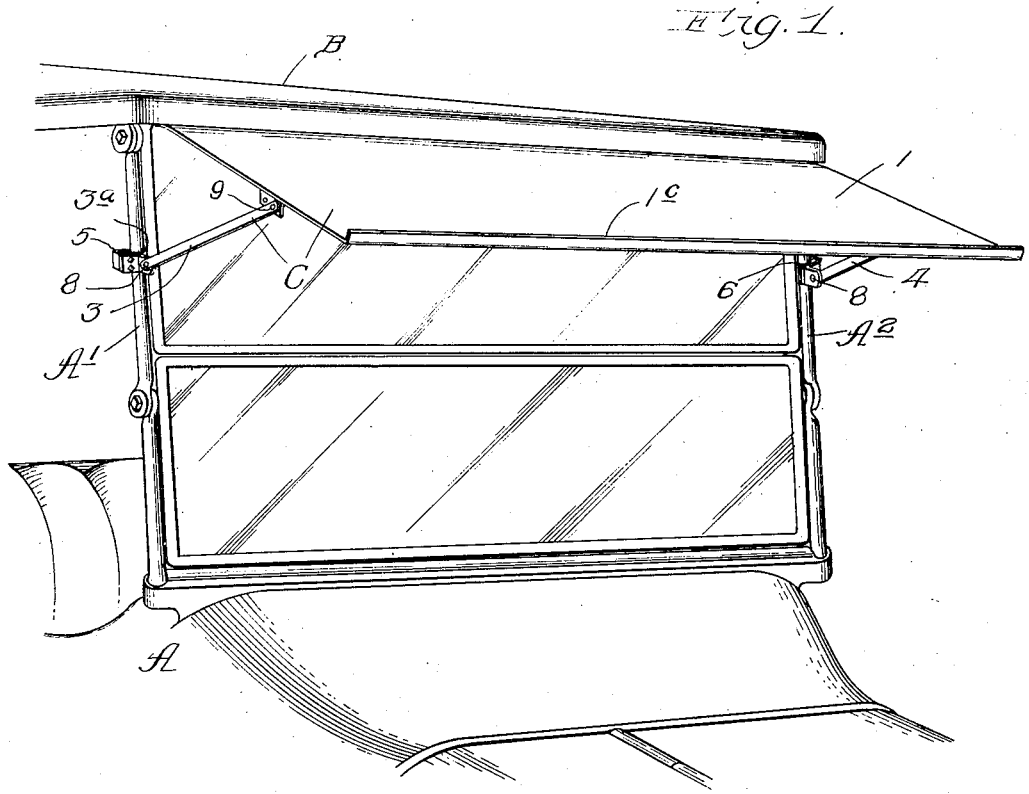
Inventor,
John Berg, April 7, 1925. 1,532,726
J. BERG
MOTOR VEHICLE VISOR
Filed Nov. 5, 1921    2 Sheets-Sheet 2
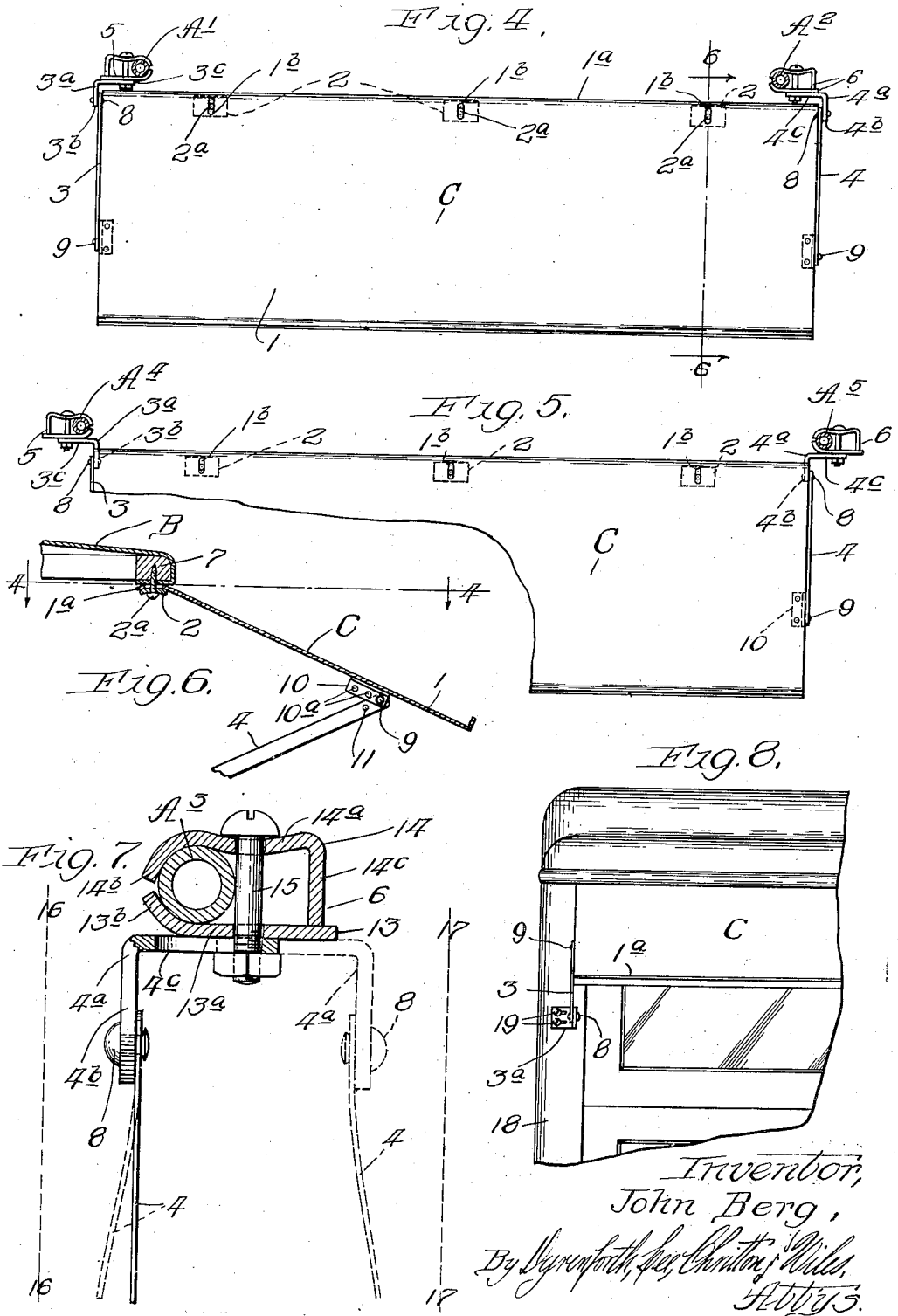

Patented Apr. 7, 1925.

1,532,726

UNITED STATES PATENT OFFICE.

JOHN BERG, OF CHICAGO, ILLINOIS, ASSIGNOR TO METAL SPECIALTIES MFG. COMPANY, OF CHICAGO, ILLINOIS, A CORPORATION OF ILLINOIS.

MOTOR-VEHICLE VISOR.

Application filed November 5, 1921. Serial No. 513,060.

*To all whom it may concern:*

Be it known that I, JOHN BERG, a citizen of the United States, residing at Chicago, in the county of Cook and State of Illinois, have invented a new and useful Improvement in Motor-Vehicle Visors, of which the following is a specification.

This invention relates particularly to visors for automobiles; and the primary object is to provide an improved visor which can be readily adjusted to give the desired inclination and which can be interchangeably used on automobiles having windshields of varying widths.

The invention is illustrated, in its preferred embodiment, in the accompanying drawing, in which—

Fig. 1 represents a broken perspective view of the front portion of an automobile body equipped with the improved visor; Fig. 2, a broken perspective view of the clamp employed at the far side of the machine as viewed in Fig. 1; Fig. 3, a broken perspective view of the same clamp, showing a reversal of the parts to accommodate the device to an automobile having more widely separated wind-shield posts; Fig. 4, a plan sectional view taken as indicated at line 4 of Fig. 6, showing the visor applied to the posts of a relatively narrow wind-shield; Fig. 5, a similar view, broken away, showing the visor applied to more widely separated posts; Fig. 6, a broken sectional view taken as indicated at line 6 of Fig. 4; Fig. 7, a broken sectional view illustrating the manner in which the improved visor may be adjusted to wind-shields of varying widths; and Fig. 8, a broken front elevational view showing the improved visor applied to the front of a closed car.

In the construction illustrated, A represents an automobile body equipped with wind-shield posts A' and A²; B, the automobile top; and C, the improved visor applied to the automobile.

The visor preferably comprises a sheet-metal member 1 which constitutes the visor proper; clips 2 adjustably securing the upper rear edge of the member 1 to the front portion of the top B; links 3 and 4 having their front ends pivotally connected with the lateral edges of the member 1; angle-form brackets 3ª and 4ª pivotally connected with the rear ends of the links 3 and 4; and post-clamps 5 and 6 adjustably connected, respectively, with the bracket-clips 3ª and 4ª.

As indicated, the visor proper is preferably formed from thin sheet-metal. It may be formed, however, from any suitable sheet material. The rear edge portion of the member 1 is curved to form an arc 1ª, as will be understood from Fig. 6. The curved rear margin of the member 1 is provided with slots 1ᵇ. Preferably one of these slots is located at the center and there are two other slots located near the lateral edges of the member 1. The small clips 2 are provided with perforations which receive screws 2ª. These screws pass thru the slots 1ᵇ and into the front cross-bow 7 of the top B. The clips are disposed in the concavity at the rear edge of the visor proper and are made concavo-convex to conform to said concavity. It will be understood that the member 1 may be rocked upon the rounded portion to secure the desired inclination of the visor, after which the screws 2ª may be tightened to secure the rear edge of the visor in position.

The angle-form clip 3ª and the angle-form clip 4ª are provided, respectively, with flanges 3ᵇ, 3ᶜ and 4ᵇ, 4ᶜ. The rear ends of the links 3 and 4 are connected with the flanges or wings 3ᵇ and 4ᵇ by rivets 8, which afford pivotal connections. The front ends of the links 3 and 4 are connected, by small bolts 9, with angle-form clips 10 which are secured to the underside of the member 1 at its lateral edges a short distance back of the lower, front edge of said member. The clips 10 are provided with a series of perforations 10ª. Any pair of perforations may be selected for the bolts.

The links 3 and 4 may be provided at their front ends with a series of perforations. For example, in Fig. 6, the link 4 is shown provided with perforations 11, in one of which is entered the bolt 9. The angle-form bracket-clips 3ª and 4ª are similarly formed. In use, however, the flanges 3ᶜ and 4ᶜ are turned in opposite directions. For example, in Fig. 4 the flanges 3ᶜ and 4ᶜ are shown extending towards each other; and in Fig. 5, they are shown extending away from each other. A description of these bracket-clips will be understood by reference to Fig. 2. Thus, the angle-form bracket 4ᵃ has its base flange 4ᶜ provided with a pair of parallel slots 12.

Also, a description of the post-clamps 5 and 6 will be understood by reference to Fig. 2. Thus, the post-clamp 6 comprises a jaw 13 and a jaw 14. The jaw 13 has a shank 13ᵃ and a curved jaw portion 13ᵇ. The shank 13ᵃ is in the form of a flat plate which fits against the flange 4ᶜ and is adjustably related thereto. The jaw 14 comprises a web portion 14ᵃ, a jaw portion 14ᵇ, and a flange 14ᶜ. The edge of the flange 14ᶜ fulcrums on the marginal portion of the shank 13ᵃ of the jaw 13. The jaws are clamped together and to the flange 4ᶜ of the angle-bracket 4ᵃ by means of bolts 15 which extend thru the slots and through suitable perforations in the portions 13ᵃ and 14ᵃ of the jaws. It will be understood that the jaw portions 13ᵇ and 14ᵇ clamp the posts of the wind-shield.

The view shown in Fig. 2 corresponds with the view shown in Fig. 4, except that the bolts 15 are not adjusted to the extreme outer ends of the slots 12. Fig. 3 shows the link 4 reversed, so that the flange 4ᶜ points outwardly in the manner shown at the right-hand portion of Fig. 5; and the clamp 6 is reversed on the flange 4ᶜ of the bracket 4ᵃ. The view shown in Fig. 3 corresponds with the view shown at the right-hand portion of Fig. 5, except that the bolts 15 are not at the extreme outer ends of the slots 12. The reversal of the link 4 is accomplished by removing the bolt 9 and turning the link over. Figs. 4 and 5 show the extremes of adjustment, in the one case to a car having a narrow wind-shield, and in the other to a car having a wide wind-shield.

However, a still wider range of adjustment may be secured by flexing the links 3 and 4, which are made of thin strips of steel which may be readily flexed laterally. Thus, in Fig. 7, the clamp 6 is shown applied to a wind-shield post A³. The link 4 and the bracket 4ᵃ shown in full lines are positioned to accommodate the device to a wider wind-shield. It will be understood that the length of the visor proper 1 remains the same for the different cars. Thus, the dotted line 16—16 may indicate the lateral edge of the visor with respect to the post A³ and the dotted lines of the link 4 at the left-hand portion of Fig. 7 may indicate how the link is flexed to accommodate the visor to a very wide wind-shield. On the other hand, the right-hand portion of Fig. 7 illustrates an adjustment for a very narrow wind-shield. Here the dotted line 17—17 may indicate the lateral edge of the visor with respect to the post A³. It will be seen, therefore, that a considerable range of adjustment may be readily secured with the improved device, this range of adjustment corresponding approximately with the distance between the lines 16—16 and 17—17. This may amount to as much as four inches.

In Fig. 5, A⁴ and A⁵ represent wind-shield posts of a relatively wide wind-shield.

Fig. 8 illustrates the manner in which the improved visor can be applied to the front of a closed car. In this case, the post-clamps 6 are not needed. Here the angle-form brackets 3ᵃ and 4ᵃ may be secured directly to the corner-posts 18 of the automobile body by means of screws 19 which pass thru the slots with which the angle-form brackets are provided. Adjustment of the wind-shield to varying widths of bodies may be secured in a manner which is obvious from the foregoing description.

The metal visor 1 is preferably provided at its lower, front edge with an upward curved flange 1ᶜ which serves to collect rain and causes the water to run to the lateral edges of the visor, where it is discharged. This prevents water from dripping over the lower edge of the visor and blowing against the wind-shield.

If desired, the visor proper may be made from suitable stiff sheet material other than sheet-metal.

The construction described is simple, may be manufactured cheaply, is capable of wide range of adjustment, and is thoroughly adapted to the purpose.

The foregoing detailed description has been given for clearness of understanding only, and no unnecessary limitations should be understood therefrom, but the appended claims should be considered as broadly as permissible in view of the prior art.

What I regard as new, and desire to secure by Letters Patent:—

1. A device of the character set forth, comprising a visor, means for connecting the rear upper portion of the visor with the top of an automobile, a pair of links having their front ends pivotally connected with the lateral edges of said visor, angle-form brackets pivotally connected with the rear ends of said links, and post-clamps adjustably secured to the free flanges of said brackets.

2. A device of the character set forth, comprising a visor, means for connecting the rear upper portion of the visor with an automobile top, a pair of links having their front ends pivotally connected with the lateral edges of said visor, angle-form brackets pivotally connected with the rear ends of said links and having their free flanges provided with horizontal slots, and post-clamps equipped with bolts extending through said slots.

3. A device of the character set forth, comprising a visor, a pair of links having their front ends detachably connected pivotally with the lateral edges of said visor to permit reversibility, angle-form brackets pivotally connected with the rear ends of said links, and post-clamps reversibly mounted on said brackets.

4. A device of the character set forth, comprising a visor having a curved rear edge portion provided with slots, screws adapted to extend through said slots and secure the visor to an automobile top, the curved portion of the visor permitting adjustment of inclination of the visor, links having their front ends pivotally connected with the lateral edges of the visor, and supporting means for said links having pivotal connections with the rear ends of the links.

5. A device of the character set forth, comprising a visor having a curved rear edge portion provided with slots, screws adapted to extend through said slots and secure the visor to an automobile top, the curved portion of the visor permitting adjustment of inclination of the visor, links having their front ends pivotally connected with the lateral edges of the visor, and angle-form brackets pivotally connected with the rear ends of said links and having their free flanges provided with slots.

6. A device of the character set forth, comprising a visor having a curved rear edge portion provided with slots, screws adapted to extend through said slots and secure the visor to an automobile top, the curved portion of the visor permitting adjustment of inclination of the visor, links having their front ends pivotally connected with the lateral edges of the visor, angle-form brackets pivotally connected with the rear ends of said links and having their free flanges provided with slots, and post-clamps equipped with bolts adjustably mounted in said slots.

7. A device of the character set forth, comprising a visor proper composed of stiff sheet material and provided at its lower front edge with an upturned flange and having a curved rear edge portion provided with slots, clips and screws adapted to adjustably secure the rear edge portion of the visor to the front portion of an automobile top, a pair of links having their front ends pivotally connected with the lateral edges of said visor, and brackets pivotally connected with the rear ends of said links.

JOHN BERG.